United States Patent [19]

Conway et al.

[11] Patent Number: 4,533,446

[45] Date of Patent: Aug. 6, 1985

[54] RADIATION-ACTIVATABLE ANAEROBIC ADHESIVE COMPOSITION

[75] Inventors: Paul Conway; David P. Melody; John Woods; J. Eisirt Casey; Bernard J. Bolger; Francis R. Martin, all of Dublin, Ireland

[73] Assignee: Loctite (Ireland) Ltd., Dublin, Ireland

[21] Appl. No.: 515,540

[22] Filed: Jul. 20, 1983

[51] Int. Cl.³ ............................ C08F 2/50; B05D 3/06
[52] U.S. Cl. ........................ 204/159.24; 204/159.19; 156/273.3; 523/176
[58] Field of Search ...................... 204/159.23, 159.24

[56] References Cited

U.S. PATENT DOCUMENTS

| | | | |
|---|---|---|---|
| 3,855,040 | 12/1974 | Malofsky | 156/316 |
| 3,956,420 | 11/1976 | Kato et al. | 525/100 |
| 4,343,885 | 10/1982 | Reardon | 430/332 |
| 4,376,839 | 3/1983 | Malin | 204/159.22 |
| 4,380,613 | 4/1983 | Nativi | 524/440 |
| 4,446,246 | 5/1984 | McGinniss | 525/370 |

Primary Examiner—John C. Bleutge
Assistant Examiner—A. H. Koeckert
Attorney, Agent, or Firm—Walter J. Steinkraus; Eugene F. Miller

[57] ABSTRACT

An anaerobic adhesive composition activatable by ultraviolet or visible radiation is disclosed which forms strong bonds with lapped surfaces and which is comprised of (a) an anaerobically polymerizable acrylate ester monomer, (b) a compound which decomposes upon exposure to ultraviolet or visible light radiation to release a strong acid, (c) a peroxy free radical initiator capable of initiating the polymerization of the monomer upon substantial exclusion of oxygen and (d) an activator of anaerobic polymerization which, in the presence of a strong acid, reacts with the peroxide initiator to produce free radicals to catalyze the anaerobic polymerization of the monomer.

23 Claims, No Drawings

RADIATION-ACTIVATABLE ANAEROBIC ADHESIVE COMPOSITION

BACKGROUND OF THE INVENTION

1. Field of the Invention

This invention relates to adhesive compositions. More particularly, it relates to anaerobic curing compositions activatable, with respect to polymerization, by exposure to suitable radiation, which may be in the ultraviolet or visible region of the spectrum.

2. The Prior Art

A drawback with anaerobic curable adhesives is that they are extremely dependent on the substrate used and on the gap size between the two parts that are to be adhered together. When inactive substrates (e.g. glass or brass) or large gaps occur when using anaerobic adhesives, weak bonds or no bonds at all are obtained. This problem is normally overcome by using either a heat cure or a two-part adhesive or an activator pre-applied as a spray from a dilute solvent solution to one or both substrates. A heat cure is expensive; two part systems introduce problems of mixing, and pre-applied primers can lead to noxious fumes and vapors. The invention seeks, among its objects, to ameliorate or overcome some or all of the above recited disadvantages by providing a composition which may be used as a one-part adhesive or sealant.

SUMMARY OF THE INVENTION

In accordance with the present invention, there is provided a one-part composition having anaerobic curing properties, activatable with respect to polymerization by irradiation with ultraviolet or visible light which is suitable for adhering sealing surfaces without the application thereto of heat or primers, which composition is comprised of (a) a curable monomer containing a polymerizable acrylate functionality, (b) a compound which decomposes upon exposure to ultraviolet or visible radiation to generate a strong acid, (c) a peroxide initiator and (d) an activator which in the presence of a strong acid reacts with peroxide initiators to produce free radicals which catalyze the anaerobic polymerization of the curable monomer.

It has been determined that when either the peroxide initiator, accelerator or radiation decomposible compound is absent from the compositions of the present invention, the composition may undergo polymerization when irradiated, but there is no evidence that polymerization will continue after the source of irradiation is removed.

The invention also embraces a process for adhering or sealing surfaces which comprises applying to at least one of said surfaces the above polymerizable composition, then placing the surfaces in abutting relationship, thereby excluding oxygen and causing the composition to cure, i.e., polymerize to adhere the abutting surfaces.

The curable compositions of the present invention are formulated as a one-part composition in which the radiation decomposible compound, initiator and accelerator compounds are combined with the polymerizable acrylate ester to form an anaerobic composition which can adhere abutting surfaces without the use of heat or primers.

PREFERRED EMBODIMENTS

Anaerobic compositions are characterized by their ability to remain liquid in the presence of air, but cure to a strong adhesive bond when air is excluded, as by assembling overlapped surfaces to which the composition has been applied. Exemplary of anaerobic polymerizable acrylate ester compositions useful in the practice of the present invention include alkylene glycol polyacrylates such as di-, tri and tetraethylene glycol dimethacrylate, di(pentamethyleneglycol) dimethacrylate; tetraethylene glycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

A class of monomers preferred in the practice of the present invention are those acrylate-terminated compounds containing one, and preferably multiple urethane linkages in the backbone, in a ring structure incorporated in the backbone, or pendant from the backbone. For convenience, these are all referred to herein as "urethane-acrylates."

Urethane-acrylates are known to the art, the preparation of such monomers being disclosed in Gorman et al, U.S. Pat. No. 3,425,988, the disclosure of which is incorporated herein by reference.

The urethane-acrylates disclosed in Gorman et al may be regarded as the reaction products of an organic polyisocyanate (e.g. toluene diisocyanate) and a monoacrylate having a reactive hydrogen atom in the alcoholic portion thereof (e.g. hydroxypropyl methacrylate).

Illustrative of the organic polyisocyanate compounds useful in the preparation of the urethane-acrylates include the higher alkenyl diisocyanates, the cycloalkenyl diisocyanates and the aromatic diisocyanates containing 8 to 30 carbon atoms, such as, for example, octamethylene diisocyanate, durene diisocyanate, 4,4'diphenyldiisocyanate and toluene diisocyanate.

Illustrative of mono-acrylate compounds used to prepare the urethane-acrylates are alkyl and aryl acrylate esters such as hydroxyethyl acrylate, hydroxyethyl methacrylate, 3-hydroxypropyl methacrylate, hydroxyhexyl acrylate, hydroxyoctyl methacrylate and the like.

Another group of urethane-acrylates useful in the preparation of the compositions of the present invention are those disclosed by Baccei which are one-component polymerizable block copolymers (prepolymers) having rigid and flexible segments. This is achieved by the chemical linking of precursor "prepolymers", such as a polyisocyanate/polyalkylene glycol reaction product having unreacted isocyanate functionality, which are subsequently "capped" with an acrylate, e.g. methacrylate functionality. These monomers include a urethane-acrylate-capped polybutadiene polyol (U.S. Pat. No. 4,295,909) a urethane-acrylate capped poly (methylene) ethyl polyol (U.S. Pat. No. 4,309,526) and a urethane-acrylate-capped vinyl grafted poly(alkylene)ether polyol (U.S. Pat. No. 4,018,851).

The polymerizable acrylate compounds comprise about 40 percent to about 97 percent by weight of the composition of the present invention and preferably comprise about 90 to about 97 percent by weight of the composition, the remainder of the composition being comprised of the radiation decomposable compounds, initiator and activator compounds.

Compounds which decompose upon exposure to ultraviolet or visible radiation useful in the practice of the present invention include salts of complex halogenides represented by the formula $$[A]_d{}^+[MX_e]^{-(e-f)} \quad 5$$

wherein A is a cation selected from iodonium, Group VI a-onium, thiopyrylium and diazonium, M is a metal or metalloid, X is a halogen radical, $d=e-f$, $f=$ the valence of M and is an integer equal to from 2 to 7 inclusive and e is $>f$ and is an integer having a value up to 8, and compounds of the formula $$R[O.SO_2.CQ_3]_n$$

wherein R is an organic radical of valency 1 to 4 and Q is hydrogen or fluorine and n is an integer from 1 to 4.

Salts of complex halogenides represented by formula I decompose, upon exposure to ultraviolet or visible radiation to release strong acids.

Complex anions included by $[MX_e]^{-(e-f)}$ of Formula I are for example $FeCl_4{}^-$, $SnCl_6{}^=$, $SnCl_5{}^-$, $SbCl_6{}^-$, $BiCl_5{}^=$, $AlF_6{}^\equiv$, $GaCl_4{}^-$, $InF_4{}^-$, $TiF_6{}^=$, and $ZrF_6{}^=$. Complex halogenide anions preferred in the practice of the present invention include $BF_4{}^-$(tetrafluoroborate) $PF_6{}^-$(hexafluorophosphate, $AsF_6{}^-$(hexafluroarsenate) and $SbF_6{}^-$(hexafluoroantimonate). Illustrative of metals represented by M, the metalloid central atom, include, Sb, Fe, Sn, Bi, Al, Ga, In, Ti, Zr, Sc, V, Cr, Mn, rare earth elements such as the lanthanides, for example, Ce, Pr, Nd, actinides such as Th, Pa, U, Np and the metalloids such as B, P and As.

Illustrative of halogens represented by X in formula I include chlorine, fluorine and bromine.

Iodonium cations represented by A of the complex halogenide salts of formula I include compounds of the formula $$[R^1R^2I]^+$$

wherein $R^1$ and $R^2$ are monovalent aromatic organic radicals which may be the same or different.

Radicals included by R, are for example, $C_{(6-20)}$ aromatic univalent carbocyclic or heterocyclic radicals which radicals can be substituted with 1 to 4 monovalent radicals selected from $C_{(1-8)}$ alkoxy, alkylphenyl, chlorophenyl, nitrophenyl, methoxyphenyl and pyridyl and $R^1$ and $R^2$, taken together, are a bivalent radical having the structure:

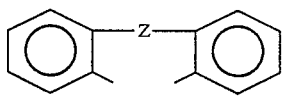

wherein Z is selected from

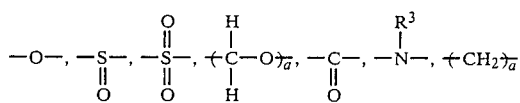

or a single bond, $R^3$ is a $C_{(1-8)}$ alkyl radical or a $C_{(6-13)}$ arylradical and $a$ is an integer equal to 1 to 8 inclusive.

Iodonium salts useful in the practice of the present invention include:

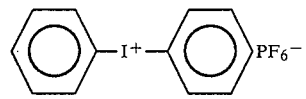

Diphenyliodonium hexafluorophosphate

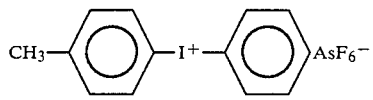

p-Tolyphenyliodonium hexafluoroarsenate

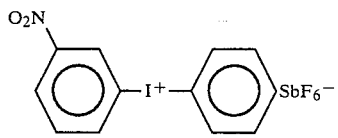

m-Nitrophenyl phenyl iodonium hexafluoro-antimonate.

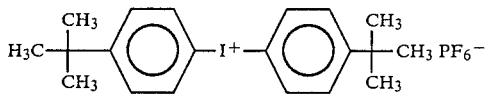

di-(4-t-butylphenyl)iodonium hexafluorophosphate.

Group VI a -onium cations represented by A of the complex halogenide salts of formula I include compounds of the formula $$[(R_b{}^4)(R_c{}^5)(R_d{}^6)G]^+$$

where $R^4$ is a monovalent radical selected from alkyl, alkoxy and aromatic radicals, $R^5$ is a monovalent organic aliphatic radical selected from alkyl, cycloalkyl and substituted alkyl and $R^6$ is a bivalent radical selected from alkylene radicals and alkylene radicals having —O— or —S— in the chain and an alkylene having at least one aryl group pendant therefrom, b is a whole number equal to 0 to 3 inclusive, c is a whole number equal to 0 to 2 inclusive, d is a whole number equal to 0 or 1 where the sum of $b+c+2d$ is a value equal to 3, and G is a Group $VI_a$ element selected from sulfur, selenium and tellurium.

Radicals included by $R^4$, are for example, alkyl radicals of 1 to 8 carbon atoms, alkoxy radicals of 1 to 8 carbon atoms, $C_{(6-13)}$ aromatic hydrocarbon radicals such as phenyl, tolyl, naphthyl, anthryl, and such radicals substituted with nitro, chloro, hydroxy, thioaryloxy, aromatic heterocyclic radicals such as pyridyl and furfuryl. $R^5$ radicals include $C_{(1-18)}$ alkyls such as methyl, ethyl, propyl, substituted alkyl such as —$C_2H_{40}OCH_3$, —$CH_2COOC_2H_5$—, —$CH_2$—CO—$CH_3$ and $R^6$ radicals include such structures as:

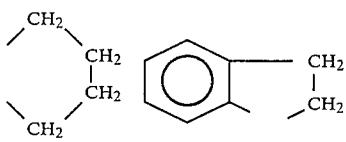

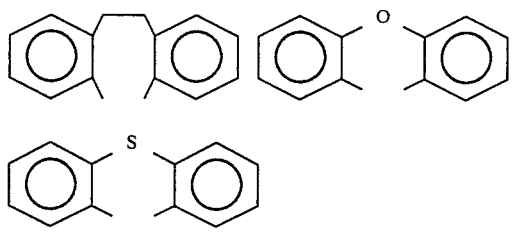

Sulphonium compounds included by formula I are for example:

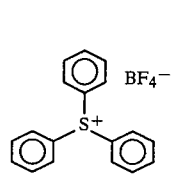 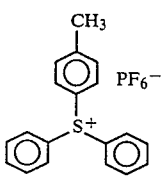

Triphenylsulphonium tetrafluoroborate

Diphenyl tolylsulfonium hexafluorophosphate

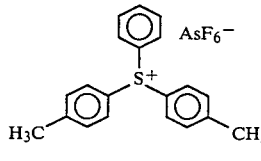 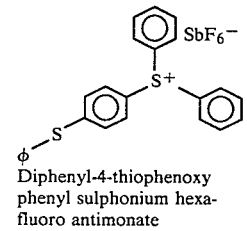

Phenylditolyl sulphonium hexafluoroarsenate

Diphenyl-4-thiophenoxy phenyl sulphonium hexafluoro antimonate

Thiopyrylium cations represented by A of the complex halogenide salts of formula I include compounds of the formula:

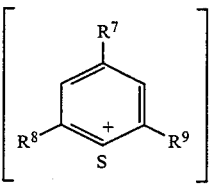

wherein $R^7$, $R^8$ and $R^9$ each can represent (a) a hydrogen atom, (b) an alkyl group having from 1 to 10 carbon atoms e.g. methyl, ethyl, propyl tertiary, butyl, amyl, isoamyl, hexyl, octyl, nonyl, dodecyl and (c) aryl groups including substituted aryl groups having from 6 to 12 carbon atoms including phenyl, 4-diphenyl, 4-ethylphenyl, 4-propylphenyl and the like.

Thiopyrylium salts useful in the practice of the present invention include phenyl thiopyrylium hexafluorophosphate, 2,6 di-methyl thiopyrylium hexafluoroantimonate and 4-ethyl thiopyrylium hexafluoroarsenate.

Diazonium cations represented by A of the complex halogenide salts of formula I include compounds of the formula:

[Ar—N≡N]+ wherein the aryl group Ar is bonded to a diazonium group by replacing one of the hydrogen atoms in a carbon atom of the aromatic nucleus and where the aryl group may carry at least one pendant group except an amino group. Thus the pendant substituent may be alkyl or another common substituent or both.

Illustrative diazonium salts which may be used in the practice of the present invention include benzene diazonium tetrafluoroborate, benzene diazonium hexafluorophosphate, benzene diazonium hexafluoroarsenate and benzene diazonium hexafluoroantimonate. Compounds included by formula II are for example:

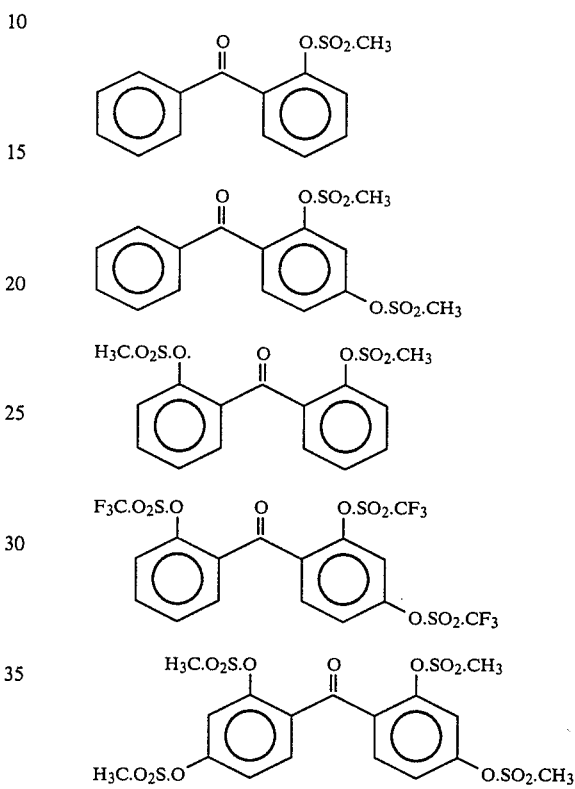

The salts of complex halogenides represented by formula I and compounds represented by formula II are incorporated in the anaerobic adhesive compositions of the present invention at concentrations of about 0.05 to about 15.0 percent by weight and preferably about 0.075 to about 3.0 percent by weight of the total weight of the composition.

Peroxy free radical initiators useful in the practice of the present invention include any of a wide variety of known peroxy initiators capable of initiating the polymerization of the acrylate monomer in the substantial absence of oxygen such as hydrogen peroxide, diacyl peroxides such as benzoyl peroxide, ketone peroxides such as methylethyl ketone hydroperoxide, hydroperoxides such as cumene hydroperoxide, tert-butyl hydroperoxide and para-methane hydroperoxide. Of these, cumene hydroperoxide is especially preferred. The initiators are used in the compositions of the present invention at a concentration of about 0.25 to about 10.0 percent by weight of the total composition and preferably about 0.5 to about 5.0 percent by weight.

Activators which in the presence of a strong acid react with peroxide initiators to produce free radicals which catalyze the anaerobic polymerization of the acrylate monomer include acetyl phenylhydrazine, thiourea and organic compounds having a ferrocenyl moiety which include ferrocene, a chemical compound having the formula $(C_5H_5)_2Fe$, the derivatives of ferrocene having the formula $$R^{11}C_5H_4-F_e-C_5H_4R^{12}$$

wherein $R^{11}$ and $R^2$ are selected from H, —COOH, —CO.CH$_3$, —CO.$\phi$, n-alkyl and vinyl, and $R^{11}$ and $R^{12}$ may be the same or different.

Ferrocene and its derivatives are preferred as activator compounds in the practice of the present invention.

The activators are used in the anaerobic adhesive compositions of the present invention at a concentration of about 0.10 to about 5.0 percent by weight and preferably about 0.25 to about 2.0 percent by weight.

The adhesive formulations of this invention may be prepared, if desired, with reactive diluents which are capable of copolymerizing with the polymerizable acrylate esters. Typical of such diluents are the hydroxyalkyl acrylates, such as hydroxyethyl acrylate, hydroxy propyl acrylate, and the corresponding methacrylate compounds, such as hydroxyethyl methacrylate and hydroxypropyl methacrylate.

The anaerobic adhesive composition may additionally contain adjuvants commonly used in the art, such as stabilizers, plasticizers, thixotropes and chelating agents. Also present may be visible light sensitizers, of which chlorothioxanthone and perylene may be cited as examples. Among the common stabilizers are included (i) free radical scavengers such as hydroquinone, naphthoquinone, benzophenone, 4-methoxyphenol and butylated hydroxytoluene, and (ii) scavengers of residual acid, such as tri-n-butylamine and 2,6-di-tert-butyl-4-methylpyridine. The addition of chelating agents such as the sodium derivatives of polycarboxylated alkylene diamines, e.g. tetrasodium ethylene diamine tetraacetic acid also stabilize the anaerobic adhesive composition against premature polymerization. These stabilizing compounds are normally incorporated in the compositions of the present invention in 10 to 1000 ppm range. The proportions of other adjuvants, such as antioxidants, if used, are familiar to those skilled in the art.

Although the invention is to be understood as not bound by or dependent on any particular theory as to its operation, the following is postulated as to the method of operability of the claimed compositions as one-part anaerobic adhesive compositions.

The compositions of the present invention after application as a liquid film layer on a suitable substrate such as mild steel or glass and upon exposure to an appropriate source of radiation, the radiation decomposible salts, such as the onium salts of complex halogenides, release strong acid compounds which activate the cure system. The liberated acid reacts with the activator compound such as ferrocene to yield an intermediate compound of unknown structure which reacts with the peroxy initiator (e.g. cumene hydroperoxide) to generate free radicals. Once the intermediate compound has been formed, polymerization takes place in due course, so that further radiation is unnecessary.

As the polyermization reaction is of a free radical nature, it exhibits oxygen stabilization, so that as long as ambient oxygen remains in contact with the irradiated film layer, polymerization is inhibited. When oxygen is removed or otherwise excluded from the film layer as by application of an abutting second substrate surface to the irradiated film layer, polymerization will continue to completion, although a complete cure may take up to 24 hours. It will be clear that in the practice of the present invention, the adhesive compositions claimed herein may be applied to a surface, irradiated to activate it, and then assembled to another surface some time after activation, to yield a satisfactory adhesive bond. This property is advantageous for manufacturing processes, where such a delay may be needed or helpful.

It will be appreciated that the presence of acids in the compositions of the present invention will tend to destabilize the cure system described above, for which reason monomers having acidic functional groups should be avoided or restricted to low concentrations, for acceptable shelf life properties of the adhesive compositions.

The type, intensity and duration of irradiation for activation of the compositions of the present invention are important, but can easily be found by trial and error for any given composition of the invention. In general, it has been found that an ultraviolet source with a substantial output at a wave length of 250 nm gives acceptable results. When certain onium compounds e.g.

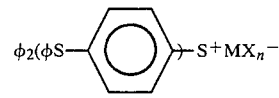

are used in the adhesive composition of the present invention, a tungsten lamp may be used. Inadequate irradiation results in weak bonds, whereas excessive irradiation is to be avoided as excessive irradiation overactivates the cure system causing the composition to gel rapidly. A suitable intensity of irradiation may be found by routine experimentation.

The location chosen for irradiation is not critical. Thus the adhesive film layer may be irradiated after application to the substrate surface or the liquid adhesive may be irradiated before it is applied to the substrate. For example, the adhesive may be dispensed through a thin tube of transparent glass or plastics, such as polyethylene of 1 mm bore and 1 cm to 1 m long having a wall thickness of about 0.1 or 0.2 mm. The radiation intensity in such a case is about 10,000 $\mu$W/cm$^2$, measured at wavelength of 365 nm and the dwell time of the liquid under exposure is about 2 to 5 minutes, preferably about 3 minutes. The liquid which emerges from the end of the tube after this treatment can be spread on a substrate, in the presence of air, and will harden when air is excluded as by applying another substrate. If the irradiated adhesive is left too long in the tube, however, it will set, e.g. after several minutes to 1 hours; thus the described procedure is specially adapted for production runs in factory conditions. Wider diameter tubing may be used in conjunction with static mixers. The static mixers help insure that the composition is homogeneously irradiated.

The following examples provide specific illustrations of various aspects of the present invention and are in no way intended to limit it. All parts and percentages are by weight unless otherwise indicated.

EXAMPLE I

A radiation activatable anaerobic adhesive composition was prepared by mixing the following ingredients together in the following weight percentages:

| ADHESIVE COMPONENT | WEIGHT PERCENT |
| --- | --- |
| Monomer A | 23.3 |
| Monomer B | 50.7 |
| Hydroxypropyl methacrylate | 20.5 |
| Diphenyliodonium hexafluorophosphate | 2.87 |
| Ferrocene | 0.944 |
| Cumene hydroperoxide | 1.64 |

Monomer A was a urethane-acrylate reaction product of toluene diisocyanate and the hydroxypolyoxypropylene derivative of trimethylolpropane (commercially available under the trademark Pluracol TP 2450) having unreacted isocyanate functionality capped with hydroxyethyl methacrylate.

Monomer B was urethane-acrylate prepared by reacting two moles of toluene diisocyanate with 1 mole of hydrogenated bisphenol A, diluting the reaction mixture with methyl methacrylate and further reacting it with two moles of hydroxyethyl methacrylate in the manner disclosed in Example V of U.S. Pat. No. 3,425,988.

Pairs of mild steel grit blasted lapshears, 2 centimeters wide, were coated on one face with the adhesive composition of Example I and irradiated at 7000 $\mu W/cm^2$ (measured at 365 nm) for a time interval which was different for each of seven groups of pairs. The coated surfaces of each pair were firmly placed in contact 45 seconds after cessation of irradiation, to give in each case a ½ inch overlap in the length direction of the lapshears for an adhesive bond to develop. The bonds were left for 24 hours at room temperature to cure. The bond strengths were measured in the tensile shear mode, using conventional tensile testing equipment. The results are summarized in Table I below.

TABLE I

| Test No. | Irradiation time (minutes) | Average tensile shear strength (kg/cm$^2$) |
| --- | --- | --- |
| 1 | 0.0 | 18 |
| 2 | 1.0 | 11 |
| 3 | 2.0 | 7 |
| 4 | 3.0 | 37 |
| 5 | 3.5 | 121 |
| 6 | 3.75 | 124 |
| 7 | 4.0 | 164 |

The data in Table I indicate that maximum bond strength was achieved with an irradiation time of 4 minutes. Such bond strength corresponds to a commercially useful adhesive composition. If irradiation is continued for longer than 4 minutes, the system becomes overactivated and is not thereafter effectively stabilized by oxygen, resulting in weak bond strengths.

EXAMPLE II

The procedure of Example I was repeated with the exception that after the adhesive composition was applied to the lapshears and activated (at 7500 $\mu W/cm^2$, nm for 3½ minutes), the period of time before the coated surfaces were placed in contact with each other (at a 0.5 inch overlap) was varied from 15–3600 seconds to demonstrate that the composition was air stabilized after radiation activation. The overlapped surfaces were left at 24 hours at room temperature to cure. Thereafter the tensile strength of the bonded surfaces was measured and the results are recorded in Table II below.

TABLE II

| Test No. | Time Delay Before Contact of Irradiated Surfaces (Seconds) | Tensile Shear Strength (kg/cm$^2$) |
| --- | --- | --- |
| 1 | 15 | 168 |
| 2 | 30 | 162 |
| 3 | 45 | 177 |
| 4 | 60 | 197 |
| 5 | 90 | 187 |
| 6 | 120 | 207 |
| 7 | 180 | 155 |
| 8 | 300 | 135 |
| 9 | 3600 | 112 |

A reference to the data in Table II indicates that the bond strength remains fairly constant over the delay time range indicating that the activated adhesive composition was air stabilized.

EXAMPLE III

The procedure of Example I was repeated with the exception that the layer of adhesive composition coated on the lapshears was irradiated at 13,000 $\mu W/cm^2$, measured at 365 nm wherein an average tensile shear strength of 170 kg/cm$^2$ was achieved with a 1.5 minute irradiation.

EXAMPLE IV

The procedure of Example I was repeated with the exception that a mixture of two related urethaneacrylate resins was substituted for Monomers A and B and a series of ferrocene derivatives having the formula (RC$_5$H$_4$)C$_5$H$_5$Fe wherein R is a vinyl, carbonyl, alkyl (n-butyl) acetyl or benzoyl group and the formula (R$^1$C$_5$H$_4$)-Fe(R$^2$C$_5$H$_4$) wherein R$^1$ and R$^2$ are methyl groups were substituted for ferrocene as the accelerator compound in the anaerobic adhesive formulation.

The first of the urethane-acrylate resins was a polymerizable block copolymer prepared by first reacting a flexible polymeric methylene ether diol with a molar excess of diisocyanate such as a toluene diisocyanate so that the product had an -NCO group at each end of the diol. The product of the reaction was reacted with a molar equivalence of a hydroxyalkyl methacrylate to form a flexible dimethacrylate block copolymer as disclosed in Bacci, U.S. Pat. No. 4,309,526. The second resin was a urethane-acrylate resin of the type disclosed in U.S. Pat. No. 3,425,988.

The composition of these radiation activatable anaerobic adhesive formulations as well as the typical tensile strength properties thereof and the irradiation time required to achieve these tensile strengths are summarized in Table III and Table IV below.

TABLE III

| Adhesive Component | R = | Vinyl | CO$_2$H | n-C$_4$H$_9$ | Acetyl | Benzoyl |
|---|---|---|---|---|---|---|
| (RC$_5$H$_4$)C$_5$H$_5$Fe | | 1.12 | 1.17 | 0.944 | 0.232 | 1.4 |
| Urethane-acrylate Monomer mixture | | 73.9 | 73.9 | 74.0 | 74.5 | 74.6 |
| Hydroxypropyl methacrylate | | 20.5 | 20.5 | 20.5 | 20.7 | 19.6 |
| Diphenyliodonium hexafluorophosphate | | 2.86 | 2.86 | 2.87 | 2.91 | 2.75 |
| Cumene hydroperoxide | | 1.64 | 1.64 | 1.64 | 1.66 | 1.60 |
| Tensile Shear (kg/cm$^2$) | | 90 | 100 | 146 | 141 | 124 |
| Irradiation Time (minutes) | | 6 | 6 | 4 | 5 | 4 |

TABLE IV

| Adhesive Component | Weight Percent Component $R^1$ = Methyl $R^2$ = Methyl |
|---|---|
| (R$^1$C$_5$H$_4$)Fe(R$^2$C$_5$H$_4$) | 0.932 |
| Urethane-acrylate mixture | 74.1 |
| Hydroxypropyl methacrylate | 19.9 |
| Diphenyliodonium hexafluorophosphate | 2.84 |
| Cumene hydroperoxide | 2.22 |
| Tensile Shear (kg/cm$^2$) | 83 |
| Irradiation Time (minutes) | 5 |

EXAMPLE V

The procedure of Example IV was repeated with the exception that other salts of complex halogenides were substituted for diphenyl iodonium hexafluorophosphate and the layer of adhesive composition coated on the lapshears was irradiated at 10,000 μW/cm$^2$ (measured at 365 nm) for 1.75 to 3.0 minutes.

The composition of these radiation activable anaerobic adhesive formulations as well as the irradiation time required to achieve these tensile strengths are summarized in Table V below:

TABLE V

| Adhesive Component | Weight Percent* Adhesive Compositions | | |
|---|---|---|---|
| | 1 | 2 | 3 |
| Urethane-acrylate mixture | 73.9 | 73.5 | 74.4 |
| Hydroxypropyl methacrylate | 20.4 | 20.4 | 21.3 |
| Ferrocene | 0.942 | 0.940 | 0.978 |
| Cumene hydroperoxide | 1.94 | 2.04 | 2.13 |
| Topanol phenolic antioxidant) | 1018 ppm | 1021 ppm | 1063 ppm |
| Tetrasodium ethylenediamine tetraacetic acid | 204 ppm | 306 ppm | 225 ppm |
| Ditolyliodonium hexafluorophosphate | 3.07 | — | — |
| Diphenyliodonium hexafluoroarsenate | — | 2.91 | — |
| GE UVE 1014 (commercially available sulfonium salt of complex halogenide) | — | — | 1.06 |
| Tensile shear** | 166 kg/cm$^2$ | 125 daN/cm$^2$ | 187 daN/cm$^2$ |
| Irradiation time (minutes) | 1.75 | 3.0 | 1.75 |

*Unless otherwise indicated
**Average of 5 specimens

EXAMPLE VI

The procedure of Example V was repeated using adhesive composition Number 3 with the exception that although both contacting surfaces of the lapshears were coated with the composition only one surface was irradiated (at 10,000 μW/cm$^2$ for 2 minutes). The two lapshears were assembled 45 seconds after irradiation with a 0.5 inch overlap. When tested for tensile strength 24 hours later, the bond exhibited an average (5 tests) tensile shear strength of 170 daN/cm$^2$.

Thus Example VI demonstrates that strong bonds can be achieved using the compositions of the present invention when only one of the contacting surfaces is irradiated prior to assembly.

EXAMPLE VII

The procedure of Example V was repeated using adhesive composition Number 3 with the exception that only one of the lapshears was coated with the composition. The coated surface was irradiated for 2 minutes at 10,000 μW/cm$^2$ and assembled with the uncoated lapshear with a 0.5 inch overlap 45 seconds after being irradiated. Ten minutes after assembly it was not found possible to separate the lapshears in a tensile shear mode.

In a control test, the procedure of Example VII was repeated with the exception that the coated surface was not exposed to the source of radiation. Ten minutes after assembly the lapshears could be easily separated using gentle finger pressure.

Thus Example VII demonstrates that strong bonds can be achieved using compositions of the present invention when only one of the surfaces to be bonded is coated with the compositions and irradiated prior to assembly.

EXAMPLE VIII

The procedure of Example VII was repeated with the exception that glass slides were used instead of lapshears. One glass slide was coated with the composition and irradiated for 2 minutes at 10,000 μW/cm$^2$. The coated surface of the slide was then covered with a second uncoated glass slide with a 0.5 inch overlap 45 seconds after irradiation of the coated surface. When an attempt was made, 3 minutes after assembly, to separate the slides, the slides broke.

In a control test, the procedure of Example VIII was repeated with the exception that the coated glass surface was not exposed to the source of irradiation. Three minutes after assembly it was possible to separate the slides using gentle finger pressure.

Thus Example VIII demonstrates that strong bonds can be achieved using the compositions of the present invention when inactive or passive surfaces are to be bonded.

Note: All examples were carried out using a Philips HP 400 Watt glass coated mercury lamp. Other light sources giving suitable output may be used.

While specific components of the present system are defined in the working examples above, many other variables may be introduced which may in any way affect, enhance or other wise improve the present invention. These are intended to be included herein.

Although variations are shown in the present application, many modifications and ramifications may occur to those skilled in the art upon reading the present disclosure. These, too, are intended to be included herein.

What is claimed is:

1. A radiation activatable anaerobic adhesive composition comprised of
   (a) an anaerobically curable acrylate ester monomer,
   (b) a compound which decomposes upon exposure to ultraviolet or visible light radiation to release a strong acid, said compound having the formula $[A]_d{}^+[MX_e]^{-(e-f)}$ where A is a cation selected from the group consisting of iodonium and sulfonium cations, M is a metal or metalloid, X is a halogen radical, d=e-f, f=the valence of M and is an integer equal to 2 to 7, inclusive, e is greater than f and is an integer having a value up to 8,
   (c) a peroxy free radical initiator capable of initiating the polymerization of the monomer in the substantial absence of oxygen, and
   (d) an activator of anaerobic polymerization which in the presence of a strong acid reacts with the peroxide initiator to produce free radicals to catalyze the anaerobic polymerization of the monomer, said activator selected from ferrocenyl compounds having the formula $R^1C_5H_4$—$FeC_5H_4R^2$ where $R^1$ and $R^2$ are selected from —H, —COOH, —CO.CH$_3$, CO.$\phi$, n-alkyl and vinyl.

2. The composition of claim 1 wherein the anaerobically polymerizable acrylate ester monomer is a block copolymer prepared by reacting a hydroxyalkyl methacrylate with the reaction product of a polyisocyanate and a polyalkylene glycol having unreacted isocyanate functionality.

3. The composition of claim 1 wherein the anaerobically curable acrylate ester monomer is a block copolymer prepared by reacting hydroxypropyl methacrylate with the reaction product of toluene diisocyanate and the hydroxypolyoxy-propylene derivative of trimethylol propane having unreacted isocyanate functionality.

4. The composition of claim 1 wherein the anaerobically polymerizable acrylate ester monomer is a urethane-acrylate prepared by the reaction of a polyisocyanate and a monofunctionally substituted acrylate ester having an active hydrogen atom on the functional substituent.

5. The composition of claim 1 wherein the anaerobically polymerizable acrylate ester monomer is a urethane-acrylate prepared by reacting hydroxyethyl methacrylate with the reaction product of toluene diisocyanate and hydrogenated Bisphenol A.

6. The composition of claim 1 wherein the cation is sulfonium.

7. The composition of claim 1 wherein the cation is iodonium.

8. The composition of claim 1 wherein $MX_e$ is $PF_6{}^-$.

9. The composition of claim 1 wherein $MX_e$ is $AsF_6{}^-$.

10. The composition of claim 1 wherein $MX_e$ is $SbF_6{}^-$.

11. The composition of claim 1 wherein the radiation decomposible compound is diphenyliodonium hexafluorophosphate.

12. The composition of claim 1 wherein the radiation decomposible compound is ditolyliodonium hexafluorophosphate.

13. The composition of claim 1 wherein the radiation decomposible compound is diphenyliodonium hexafluoroarsenate.

14. The composition of claim 1 wherein the radiation decomposible compound is

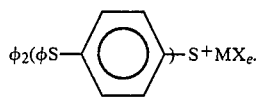

15. The composition of claim 1 wherein the peroxy free radical initiator is an organic hydroperoxide.

16. The composition of claim 15 wherein the organic hydroperoxide is cumene hydroperoxide.

17. The composition of claim 1 wherein the ferrocenyl compound is ferrocene.

18. The composition of claim 1 wherein the ferrocenyl compound is $(\phi.CO.C_5H_4)Fe(C_5H_5)$.

19. The composition of claim 1 wherein the ferrocenyl compound is $(CH_3.C_5H_4)Fe(CH_3.C_5H_4)$.

20. The composition of claim 1 wherein the radiation decomposible compound is present in the adhesive composition at a concentration of about 0.1 to about 5 percent by weight of the total composition.

21. The composition of claim 1 wherein the peroxy free radical initiator is present in the adhesive composition at a concentration of about 1.0 to about 3.0 percent by weight of the total composition.

22. The composition of claim 1 wherein the activator is present in the adhesive composition at a concentration of about 0.25 to about 5.0 percent by weight of the total composition.

23. A process for adhering substrates which comprises applying the composition of claim 1 to the surface of one or both of the substrates to be bonded to prepare a coated surface, exposing at least one of the coated surfaces to a source of ultraviolet or visible radiation of an intensity sufficient to activate the composition, placing the irradiated coated surface in abutting relationship with the other coated or uncoated surface to substantially exclude air and then allowing the composition to cure and harden to adhere the surfaces to each other.

* * * * *

UNITED STATES PATENT OFFICE
CERTIFICATE OF CORRECTION

Patent No. 4,533,446      Dated August 6, 1985

Inventor(s) Paul Conway, David P. Melody, John Woods, J. Eisirt Casey, Bernard J. Bolger, Francis R. Martin It is certified that error appears in the above-identified patent and that said Letters Patent are hereby corrected as shown below:

$--C_2H_{40}OCH_3--$ which appears at column 4, line 60 should be $--C_2H_4OCH_3--$.

Signed and Sealed this

Third Day of June 1986

[SEAL]

Attest:

DONALD J. QUIGG

Attesting Officer     Commissioner of Patents and Trademarks